US009489689B2

(12) United States Patent
Stewart (10) Patent No.: US 9,489,689 B2
(45) Date of Patent: Nov. 8, 2016

(54) 3D IMAGING (71) Applicant: Lee Martin Stewart, Austin, TX (US)

(72) Inventor: Lee Martin Stewart, Austin, TX (US)

( * ) Notice: Subject to any disclaimer, the term of this patent is extended or adjusted under 35 U.S.C. 154(b) by 0 days.

(21) Appl. No.: 14/581,199

(22) Filed: Dec. 23, 2014

(65) Prior Publication Data
US 2015/0112835 A1 Apr. 23, 2015

Related U.S. Application Data (63) Continuation of application No. 13/964,573, filed on Aug. 12, 2013, now abandoned, which is a continuation of application No. 13/906,100, filed on May 30, 2013, now abandoned, which is a continuation of application No. 13/219,294, filed on Aug. 26, 2011, now abandoned.

(60) Provisional application No. 61/379,877, filed on Sep. 3, 2010.

(51) Int. Cl.
G06Q 30/00 (2012.01)
G06Q 30/06 (2012.01)
H04N 21/236 (2011.01)
H04N 21/24 (2011.01)
H04N 21/81 (2011.01)
H04H 20/10 (2008.01)
H04H 60/11 (2008.01)
G06T 17/00 (2006.01)
(Continued)

(52) U.S. Cl.
CPC ...... G06Q 30/0633 (2013.01); G06Q 30/0641 (2013.01); G06T 17/00 (2013.01); H04H 20/103 (2013.01); H04H 60/11 (2013.01); H04L 67/10 (2013.01); H04N 7/104 (2013.01); H04N 21/23614 (2013.01); H04N 21/2404 (2013.01); H04N 21/812 (2013.01)

(58) Field of Classification Search
CPC .............. G06Q 30/0633; G06Q 30/0641; H04N 21/23614; H04N 21/2404
See application file for complete search history.

(56) References Cited

U.S. PATENT DOCUMENTS 5,002,513 A * 3/1991 Weiss .............................. 446/87
6,083,267 A * 7/2000 Motomiya et al. ............... 703/6
(Continued)

FOREIGN PATENT DOCUMENTS

WO  WO 00/57254  *  9/2000  .......... G05B 19/418
WO  WO 01/93156 A1 * 12/2001  ............ G06F 17/60

OTHER PUBLICATIONS

H. H Medellin et al. "An automated system for the assembly of octree models" Assembly Automation; vol. 24, No. 3, 2004; p. 297-312.*
(Continued)

Primary Examiner — Naeem Haq
(74) Attorney, Agent, or Firm — Hulsey, P.C.

(57) ABSTRACT

The 3D models includes parametric data and metadata. A software enables a user to specify search criteria for a selected product among a plurality of products whose 3D models are stored on the data storage device. The search software returns a list of product(s) matching the search criteria. The user selects a product and the 3D model of the selected product is streamed to the user software. The 3D model is then displayed to the user, who now can interact with the 3D model by selecting, hovering over, or decomposing the 3D model to reveal parts or subassemblies of the product in one or more stages of decomposition. Finally, e-commerce software communicates with the user software allowing the user to initiate an ecommerce transaction with respect to the parts or subassemblies depicted in the 3D model of the selected product.

17 Claims, 7 Drawing Sheets (51) Int. Cl.
*H04N 7/10* (2006.01)
*H04L 29/08* (2006.01)

(56) References Cited

U.S. PATENT DOCUMENTS

| | | |
|---|---|---|
| 6,714,200 B1 | 3/2004 | Talnykin et al. |
| 7,315,830 B1 | 1/2008 | Wirtz et al. |
| 7,352,368 B2 | 4/2008 | Frazelle et al. |
| 7,353,192 B1 | 4/2008 | Ellis et al. |
| 7,853,940 B1 | 12/2010 | Han et al. |
| 8,175,933 B2 | 5/2012 | Cook, Jr. et al. |
| 2002/0010655 A1 | 1/2002 | Kjallstrom |
| 2004/0249727 A1 | 12/2004 | Cook, Jr. et al. |
| 2005/0081161 A1 | 4/2005 | MacInnes et al. |
| 2008/0195492 A1* | 8/2008 | Postrel ............... 705/14 |
| 2010/0198563 A1 | 8/2010 | Plewe |
| 2011/0141109 A1 | 6/2011 | Radet et al. |
| 2016/0086258 A1* | 3/2016 | Romes ........... B29C 67/0088 705/27.1 |

OTHER PUBLICATIONS www.arinet.com, retrieved Mar. 22, 2000.

* cited by examiner

3D IMAGING

RELATED APPLICATIONS AND CLAIM FOR PRIORITY

The present application is a continuation application of U.S. patent application Ser. No. 13/964,573 filed Aug. 12, 2013, which claims priority from U.S. patent application Ser. No. 13/906,100 filed May 30, 2013, which claims priority from U.S. patent application Ser. No. 13/219,294 filed Aug. 26, 2011, which claims priority from U.S. Provisional Patent Application Ser. No. 61/379,877 filed Sep. 3, 2010 which is incorporated herein by reference thereto.

FIELD OF THE INVENTION

The present invention relates generally to a system, process and software for facilitating commerce and electronic commerce (e-commerce) transactions, and more specifically to a system, process and software to allow the purchase of products and parts from or within 3D models.

BACKGROUND OF THE INVENTION

Three-dimensional (3D) models are methods of rendering and manipulating a graphical object or hologram. It should be understood that the system, process and software of the present invention may be used with a model capable of rendering either a 3D image on a display screen or a 3D hologram. As used throughout this specification, the term 3D image should be understood to include imaging systems (a camera, an eye, stereogram or hologram) having 3 dimensions (x, y, z coordinates or having volume).

Within the context of electronic commerce (hereinafter "ecommerce"), 3D models are useful for displaying real tangible products and concept products on a computer as a 3D model. Importantly, 3D models enable a user to interact with the graphical rendering or image. The 3D image can be rotated about an axis, exploded, decomposed or adjusted visually or parametrically in levels of detail view to fully understand and visualize the item or product at a virtual level. This flexibility has resulted in creating a high demand for 3D models.

The term "explode" is used to refer to a rendered view of an object in which the discrete or constituent parts are separated from a clearly visible object. A partially decomposed view refers to a view in which some of the parts are removed to reveal hidden parts or assemblies. A fully decomposed view is the same as an exploded view and reveals all the parts which form the part, object or assembly.

BRIEF DESCRIPTION OF THE INVENTION

The present invention is a system and software that allows a user to interact with a rendered 3D image, part or assembly (defined as any set of N-number of parts, where N>1), select a single part or decompose the 3D assembly to its finite (discrete or constituent) parts, select a specific part or multiple parts and add that part to a commerce or electronic-commerce process (such as an online shopping cart). It should be understood that the term "interact" is intended to encompass manipulating the rendered 3D image through the use of rotating the image about any axis, enlarging or shrinking the image, exploding or decomposing the image in one or more levels of detail to reveal the constituent parts and/or sub-assemblies of the corresponding model. Optionally, interacting with the object may include displaying parametric data, metadata and/or secondary parts associated with a part (or assembly). The term "part" may encompass a discrete part such as a screw or a spring, a group of associated parts (e.g., a kit), or a sub-assembly.

3D images are differentiated from 2D static images (such as a photograph or rasterization graphics) in that displaying for the two types are distinctly accessible through separate processes. 2D parametric images or vector graphics are similar in nature to 3D parametric images with the exception that 2D parametric images either contain a third dimension (coordinate plane of value zero) or the third dimension is omitted. 2D static image processes cannot function within a 3D representation. An image map (which may or may not contain metadata) that is overlaid on a 2D static image will not function with a 3D image when the 3D model is manipulated since the 2D static data lacks a third plane of data or is set to zero. In a similar scenario a 3D image map would contain additional information that could not be viewed or accessed when manipulating the 2D image since the flat nature of the 2D image could not be manipulated in such a way as to reveal the 3D mappings. Systems of this nature implemented in 2D static mappings are cumbersome and can obscure critical information necessary for accurate parts identification and selection processes.

Stated differently, when an image map (internet term: a hypertext markup language tag <map> to define a client side region with clickable areas) is used with a 2D image the metadata is associated with the region and not the image. The problem with this approach is the image map will still be viewable and clickable if the 2D image is not available or has been changed. The relationship must be made between the image map and the 2D static image in the html where as in 3D the metadata is contained in the file format. Although the image map function might still remain intact it may become meaningless or highly confusing if the image cannot be retrieved or if the image map inadvertently is used in conjunction with another 2D image.

An embodiment of the invention is to provide a method of purchasing a part by interacting with a three-dimensional model (3D) or a derivative of the model. The client display system renders the parametric data to view the 3D model and with an action (such as clicking a mouse button or finger tap) the purchaser is able to complete an order, such as adding the part to a shopping cart or other commerce or electronic commerce purchasing application.

Due to the limitations of the patent application process it is not possible to directly show 3D images, therefore all images are 2D and are illustrated from 3D and simulate a 3D view after being manipulated for the purpose of the embodiments.

SUMMARY OF THE INVENTION

A first embodiment of the invention is an e-commerce method for initiating an e-commerce transaction with respect to a desired item, the desired item comprising at least one of a set of parts, assemblies, or subassemblies depicted in a 3D model of a selected product, wherein a user is able to interact with the 3D model, the method comprising the steps of: providing a plurality of 3D models in a data storage device, at least one the 3D models for each of a plurality of products, the 3D models including parametric data and metadata;

providing product selection instructions for enabling a user to specify search criteria for searching for a selected product among the plurality of products, wherein 3D models of the plurality of products are stored on the data storage device;

providing to the user a list of at least one product matching the search criteria using the product selection instructions;

allowing the user to select a product from the list of at least one product;

streaming a display of the 3D model of the selected product from the data storage device to the user;

allowing the user to interact with the 3D model by selecting, hovering over, or decomposing the 3D model to reveal parts, assemblies, or subassemblies of the product in one or more stages of decomposition; enabling the user to visually identify a desired item without the need for a reference parts list, table, or any other association list for identification of parts of the selected product; enabling the user to select the desired item without the need to enter any identification data; and providing transaction instructions for allowing the user to initiate an ecommerce transaction with respect to the selected item depicted in the 3D model of the selected product.

In the aforementioned method, interaction with the 3D model includes the ability to rotate the 3D model about the X, Y, and Z coordinate axis.

In the aforementioned method, interaction with the 3D model may include the ability to rotate the product image about a user-specified axis.

In the aforementioned method, selecting or hovering over a portion of a 3D model with a pointer of a pointing device displays parametric data and metadata associated with the part.

Moreover, selection of a portion of the 3D model highlights the selected portion of the 3D model. Still further, additional parts (i.e., parts other than those already selected) related to the selected item are highlighted and the user is prompted to add the additional parts to an ecommerce shopping cart or virtual shopping cart.

According to one aspect of the invention, if the selected item is available as part of a kit including additional parts then the additional parts are graphically displayed to indicate the availability of a kit and the user is prompted to add the kit to the ecommerce shopping cart or virtual shopping cart.

According to one aspect of the invention, a border is drawn around the parts which constitute the kit.

According to one aspect of the invention, the metadata includes the part name, part number and price.

According to one aspect of the invention, the ecommerce transaction includes adding a part to an ecommerce shopping cart or virtual shopping cart.

According to one aspect of the invention, the ecommerce transaction includes prompting the user with the option to purchase at least one part associated with the selected item in the virtual shopping cart.

In the aforementioned method, the user may interact with the 3D model using one or more of a pointing device, a menu structure, and a touch sensitive display screen.

In the aforementioned method, streaming the 3D model of the selected product to the user is implemented by software running on a server side workstation.

In the aforementioned method, the transaction instructions are implemented by software running on a server side workstation.

In the aforementioned method, the transaction instructions are implemented by software which communicates with at least one of a client side and server side workstations or mobile devices.

In the aforementioned method, initiating an ecommerce transaction includes transmitting metadata corresponding to the selected part to an ecommerce application.

In the aforementioned method, the user initiates an ecommerce transaction by adding a part to a shopping cart.

In the aforementioned method, the client side workstation communicates with the server side processor over the internet using a web browser or a mobile application.

A variation on the ecommerce method for initiating an e-commerce transaction with respect to a desired item, the desired item comprising at least one of a set of parts, assemblies, or subassemblies depicted in a 3D model of a selected product, wherein a user is able to interact with the 3D model, the method comprising the steps of:

providing a plurality of 3D images in a data storage device, at least one the 3D images for each of a plurality of products, the 3D images including parametric data and metadata;

providing product selection instructions for enabling a user to specify search criteria for searching for a selected product among the plurality of products, wherein 3D images of the plurality of products are stored on the data storage device;

providing to the user a list of at least one product matching the search criteria using the product selection instructions;

allowing the user to select a product from the list of at least one product;

streaming a display of the 3D image of the selected product from the data storage device to the user; allowing the user to interact with the 3D image by selecting, hovering over, or decomposing the 3D image to reveal parts, assemblies, or subassemblies of the product in one or more stages of decomposition; enabling the user to visually identify a desired item without the need for a reference parts list, table, or any other association list for identification of parts of the selected product; enabling the user to select the desired item without the need to enter any identification data; and providing transaction instructions for allowing the user to initiate an ecommerce transaction with respect to the selected item depicted in the 3D image of the selected product.

In the aforementioned method, interaction with the 3D image includes the ability to select a different view of the 3D product image.

In the aforementioned method, the different view is selected from the group comprising top, right side, left side, bottom, assembly, subassembly, and exploded.

In the aforementioned method, selecting or hovering over a portion of a 3D image with a pointer of a pointing device displays parametric data and metadata associated with the part.

In the aforementioned method, selection of a portion of the 3D image highlights the selected portion of the 3D image.

In the aforementioned method, additional parts related to the selected item are highlighted and the user is prompted to add the additional parts to a virtual shopping cart, an electronic parts replenishment system, a 3D printing device, or a 3D fabricating device.

In the aforementioned method, if the selected item is available as part of a kit including additional parts then the additional parts are graphically displayed to indicate the availability of a kit and the user is prompted to add the kit to the ecommerce shopping cart or virtual shopping cart, a 3D printing device, or a 3D fabricating device.

In the aforementioned method, a border is drawn around the parts which constitute the kit.

In the aforementioned method, the metadata includes the part name, part number and price.

In the aforementioned method, the ecommerce transaction includes adding the selected item to an ecommerce shopping cart or virtual shopping cart.

In the aforementioned method, the ecommerce transaction is implemented by software running on the server side workstation.

In the aforementioned method, the client side workstation communicates with the server side processor over the internet using a web browser or a mobile application.

The invention further relates to a system for initiating an e-commerce transaction with respect to a desired item, the desired item comprising at least one of a set of parts, assemblies, or subassemblies depicted in a 3D model of a selected product, wherein a user is able to interact with the 3D model, comprising: a database on a data storage device, the database containing at least one 3D model for each of a plurality of products, the 3D models including parametric data and metadata; a server side workstation operably connected to the data storage device and a server side software for querying the database for a product matching search criteria; a client side workstation or mobile device communicating with the server side workstation over a network; a client side software accessible to the client workstation or mobile device communicating with the server side software for querying the database for a product matching search criteria, the server side software returning a list of at least one product matching the search criteria to the client side software; in response to a user selecting one of the listed products, the server side software streaming the at least one 3D model of the selected product from the database to the client side software; a client side software allowing the user to interact with the 3D model by selecting, hovering over, or decomposing the 3D model to reveal parts, assemblies, or subassemblies of the product in one or more stages of decomposition; the client side software enabling the user to visually identify a desired item without the need for a reference parts list, table, or any other association list for identification of parts of the selected product; the client side software enabling the user to select the desired item without the need to enter any identification data; and ecommerce software allowing the user to initiate an ecommerce transaction with respect to the selected item depicted in the 3D model of the selected product.

DETAILED DESCRIPTION OF THE INVENTION

The present invention is the process, system, and software for implementing the same which allows a user to interact with a rendered three-dimensional (3D) image of a part or assembly, select a single part or set of parts (kit or sub-assembly) or decompose the 3D assembly to its discrete parts, select specific parts or sub-assemblies and add these parts with their associated metadata (description, size, weight, price, part number, etc) to an ecommerce shopping cart or a virtual shopping cart or other ecommerce purchasing application. Hereinafter reference to an ecommerce shopping cart should be understood to also include reference to a virtual shopping cart and reference to a virtual shopping cart should be understood to also include reference to an ecommerce shopping cart. Additionally, the system of the present invention may optionally include logic to proactively suggest additional or secondary parts or items that may be associated with the repair or replacement of the part(s) or assembly selected for purchase. For example, the system may suggest purchasing consumables such as gaskets and seals which are used in conjunction with the user selected part or assembly. A particular benefit of this system is that the user interacts only with rendered 3D images. A further benefit of this system is that the server side software streams the 3D model of the selected product to the client side software.

This process is accomplished by 1) providing a system software including an interactive 3D model for each of a plurality of items to enable a user to interact with a rendered 3D image of the item. The system of the present invention allows the user to decompose the rendered image of the item into its constituent parts or assemblies and then select or drag parts or assemblies into a shopping cart. As will be discussed below in further detail, the "shopping cart" may be part of an order replenishment system (such as a stock reordering system, an electronic resource planning system, or other inventory reordering systems) in which no money is exchanged but parts are ordered from or/to restock inventory. Moreover, in some embodiments, instead of ordering the parts from a distribution center, the parts may be manufactured onsite by sending the part's parametric information to a 3D printer or 3D fabricating device. Preferably, the 3D model (used interchangeably with rendered 3D image) enables the user to decompose the item in two or more levels of detail (granularity). 2) For parts that do not require decomposition, a software process is provided allowing an individual to select a rendered 3D image of a part and execute the "3D click to buy" process adding (transferring) metadata associated with the selected part to an e-commerce solution or application.

As used herein metadata is data describing the part including part number, part description, model number, assembly part number, assembly description, size, weight, diameter, stock or catalog number, price, alternative replacement part(s). The metadata may further include information identifying that the part is also available as part of a kit, or include information regarding other parts which the manufacture has indicated should be replaced along with a given part.

Figure 1:
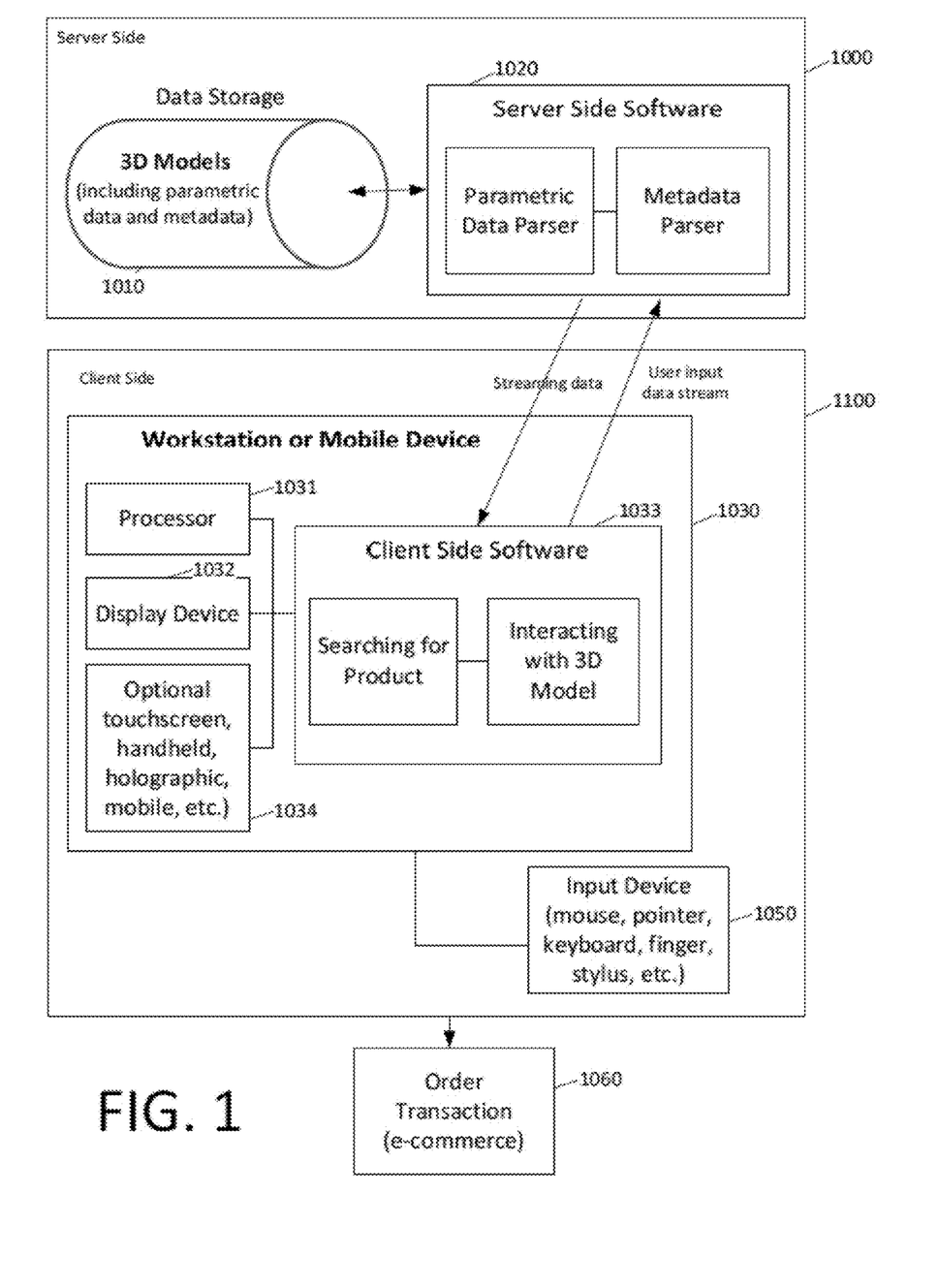
FIG. 1 is a block diagram of a system of the present invention.

FIG. 1 is a block diagram showing the most basic version of the system of one embodiment of the invention. The System includes a server side 1000 and a client side 1100. The Server Side 1000 includes a storage device 1010 storing one or more interactive 3D models and any associated parametric data and metadata. Workstation or Mobile Device 1030 includes a processor 1031, a display device 1032, and client side software 1033. Client Side Software 1033 enables the user to search for a certain product and select which 3D model or portion thereof to interact with. This user search criteria is sent to the server side software 1020 which finds the matching 3D models with their parametric data and metadata from the data storage device 1010. These matching 3D models with their parametric data and metadata are then streamed to the Client Side Software 1033 for the user to interact with by selecting, hovering over, or decomposing the 3D model to reveal parts or subassemblies of the product in one or more stages of decomposition. The display device may optionally be a touch sensitive screen, handheld, holographic, or mobile device enabling the user to interact with the 3D model. As known in the art, various finger swipe motions may be associated with commands to enlarge the image, rotate the image, explode the image, or select a part or assembly. The input device 1050 can be a keyboard, mouse, finger, stylus, or other pointing device to facilitate interaction with the 3D model.

The server side 1000 is operably connected with the client side 1100 over a network which may be a distributed and/or private network such as a WAN, VPN, or internet.

A user may interact directly with the client side software 1033 and order parts from an order fulfillment center (e-commerce software) 1060 which communicates with the System over a distributed network (e.g., internet), WAN, VPN or the like. The e-commerce software 1060 is executed within or communicating with the aforementioned Client Side Software 1033. The user indicates a desire to initiate an e-commerce transaction for a part by selecting the corresponding 3D part and then adding the part to a virtual shopping cart by dragging the 3D part to the shopping cart, right-clicking on the 3D part with a pointing device, double-clicking on the 3D part or the like. Adding a part to the virtual shopping cart may transfer metadata associated with the part to a separate e-commerce software application.

The term workstation as used throughout this disclosure is not intended to be limiting and is intended to refer to any processor capable of executing software commands.

The system of this embodiment may include a menu or control panel used to interact with the 3D model. The menu enables the user to choose a desired operation such as rotate the rendered image about an axis, shrink or enlarge the rendered image, decompose the rendered image, or add the part to the virtual shopping cart, etc. As the 3D model is decomposed in stages into its discrete components, the system of the present invention preferably maintains the menu in a stable or fixed position within the display. Once a part is selected and the "3D click-to-buy" function is executed, relevant metadata and/or the parametric data for the selected part or component is transferred into an ecommerce application.

As noted previously, some embodiments of the invention utilize 3D images rather than a 3D model. The use of a 3D model is advantageous over the use of 3D images as a model is typically more compact than a series of 3D images. The use of 3D images (as opposed to a 3D model or equivalently, a rendered 3D image) for a given product requires the storage of an image for each of a plurality of different views (perspectives). Thus the system might include a top view, side view, and 3 different levels of decomposition requiring the storage of numerous 3D images.

These 3D images may reside as stand-alone images on a website (HTML or similar), or as embedded components within document software such as Microsoft Word document processing application, Microsoft Publisher desktop publishing application, Microsoft Excel spreadsheet application, or Adobe Acrobat application software .pdf files.

3D Definition: of having or relating to three-dimensional space simulating the effect of depth by presenting parametric data in way that is lifelike or real (having mathematical volume) including presenting slightly different views of a scene to each eye. An object that has height, width and depth unlike a photograph (for example: jpg, .tiff, bmp, or .png file formatted picture) of a three-dimensional object.

Use of the system of this embodiment will be further explained with reference to the flow diagram of FIGS. 2A-2B.

In step 200 (FIG. 2A) the user accesses client side software which may be hosted on, or in the alternative communicates with, the Server Side 1000.

In step 202 (FIG. 2A) the user enters search criteria for an item and initiates a search; In step 204 (FIG. 2A) the user search criteria is sent to the server side software.

In step 206 (FIG. 2A) the search queries a database 1010;

In step 208 (FIG. 2A) matching items are then retrieved from the database.

In step 210 (FIG. 2A) the user selects an item from the displayed results, or loops back to step 204 to refine the search criteria.

In step 212 (FIG. 2A) the server side software sends the matching 3D models to the client side software.

In step 214 (FIG. 2B) the user is able to interact with the 3D model. Namely, the user is able to rotate the rendered 3D image about any axis, enlarge the image, and decompose the image into one or more levels of sub-assemblies until the item is decomposed to its constituent parts. The user is able to rotate the rendered 3D image about any of the coordinate axis (X, Y, and Z) and optionally may be provided with the ability to rotate about a user-specified axis.

In step 216 (FIG. 2B) the user is able to select one or more individual parts or subassemblies for purchase, order for inventory replenishment, or send to a 3D printing device or 3D fabricating device or the like, and in steps 218 and 220 the user is able to initiate the purchase of the items selected in the previous step. It should be noted that selection of a part is reflected graphically by changing the color or shading or the like of the selected part within the rendered 3D image.

Figure 4:
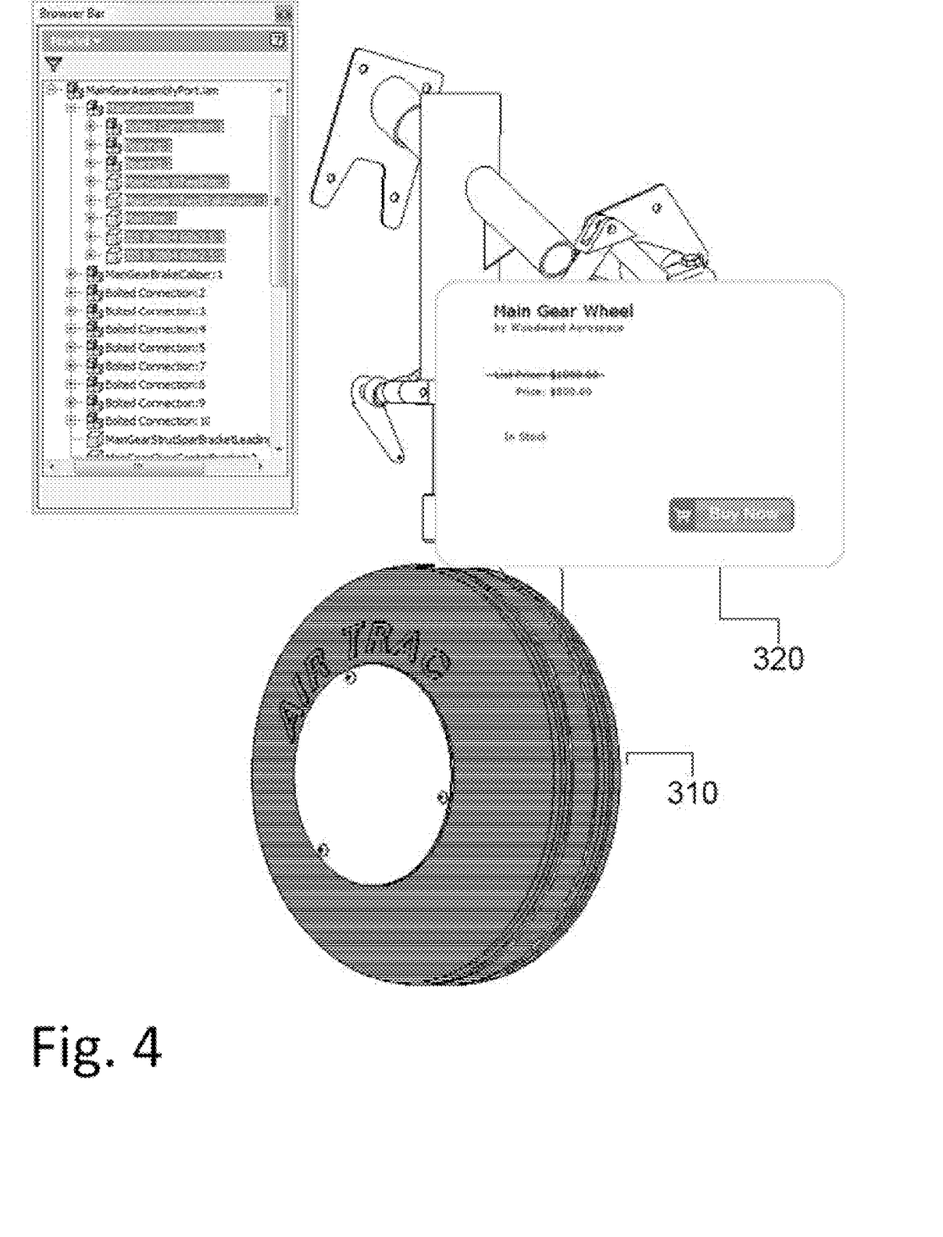
FIG. 4 illustrates the landing gear assembly of FIG. 3, after the wheel assembly was selected.

Additionally, the selection of a part triggers the display of metadata associated with the part. In FIG. 4, metadata 330 is displayed when the user selects or hovers over the wheel 310 with the pointer of the pointing device. When a part is selected the system may alert the user that the selected part is also available as part of a kit. This may be accomplished through text on the display, through highlighting, shading or coloring the constituent parts of the kit, and/or by drawing a border around the parts of the kit, or the like. In addition, the display of metadata may optionally be triggered by hovering over a portion of the rendered 3D image with a pointer of a pointing device or the like, i.e., without actually selecting the part.

Purchase of a part is initiated by, for example, right-clicking on the rendered 3D image of desired part and adding the part to the virtual shopping cart, or simply by dragging the part to the virtual shopping cart (step 220). As noted previously, the system of the invention may be part of an internal parts management system in which parts are ordered to restock inventory (i.e., not an actual purchase). In such instances adding the part to the shopping cart merely orders the parts to be restocked. Moreover, the parts may be manufactured on-site by sending the parametric data associated with the part to a 3D printing device or 3D fabricating device or the like. In such instances, the user may or may not need to purchase the part before sending the parametric information to the 3D printer or 3D fabricating device.

In step 222 the system recommends additional parts associated with the part(s) selected by the user. These additional parts may include consumables such as seals, gaskets, springs which are used in conjunction with replacement of the item(s) already selected for purchase. The system may further list items which others have purchased in conjunction with the selected item(s). It should be noted that step 222 is shown as following step 220; however, the specific placement of this step may be moved to, for example, follow step 216.

Figure 2A:
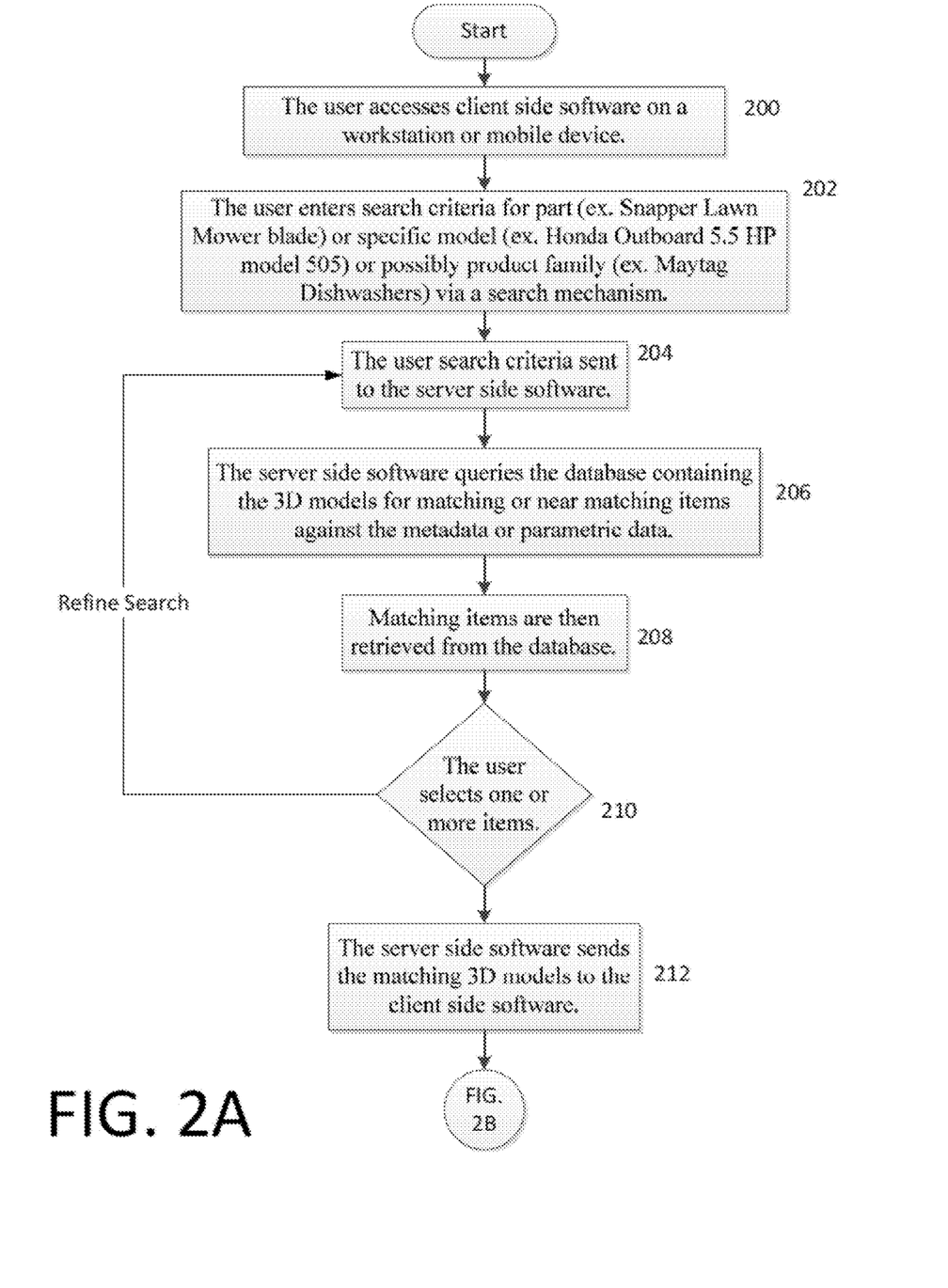
FIG. 2A-2B is a flow diagram of a system of the present invention.
Figure 2B:
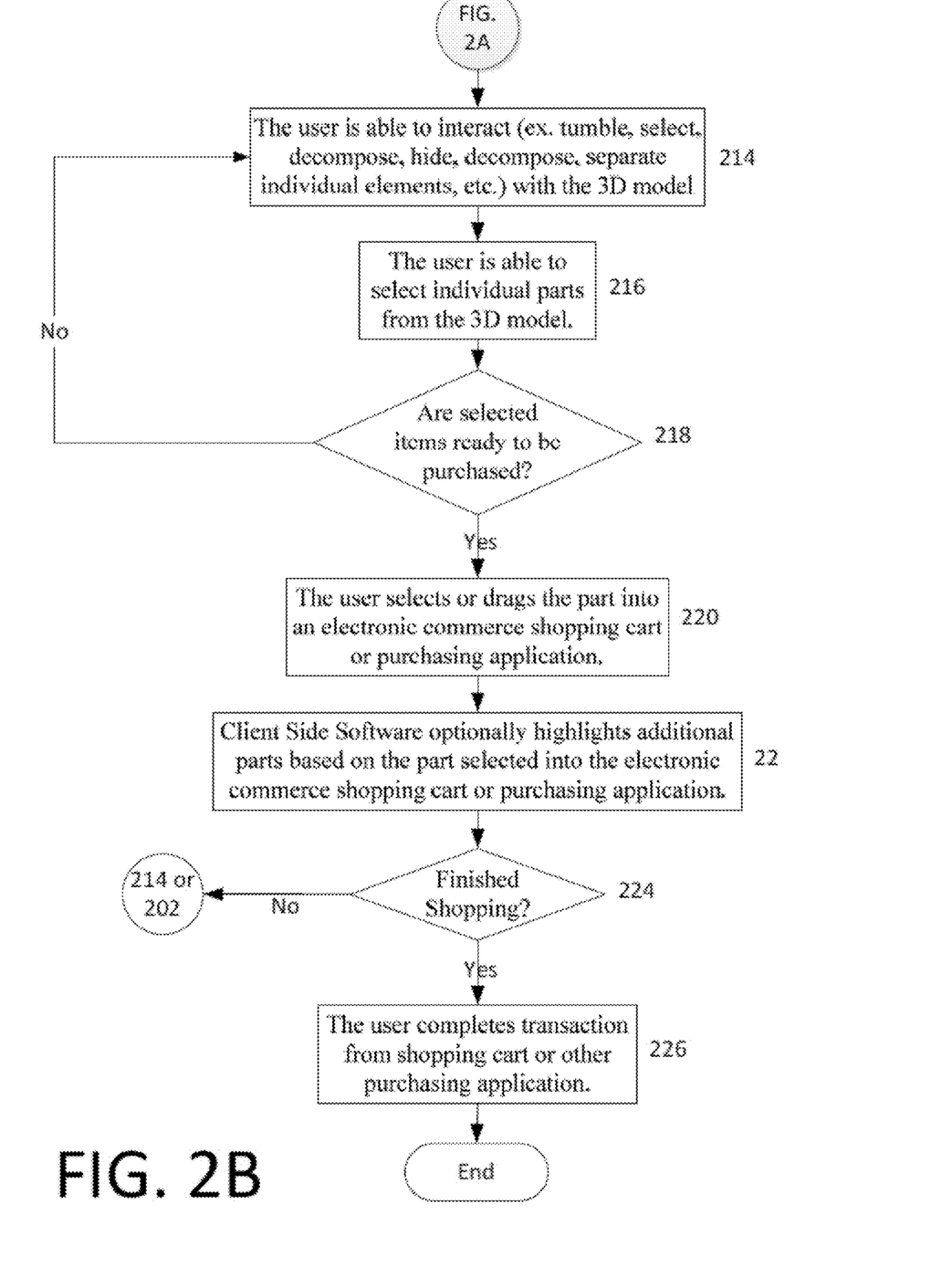

In steps 224 and 226 (FIG. 2B) the user initiates the checkout/payment processes, continues to manipulate the object in step 214 (FIG. 2B), or starts a new search in step 202 (FIG. 2A).

Figure 3:
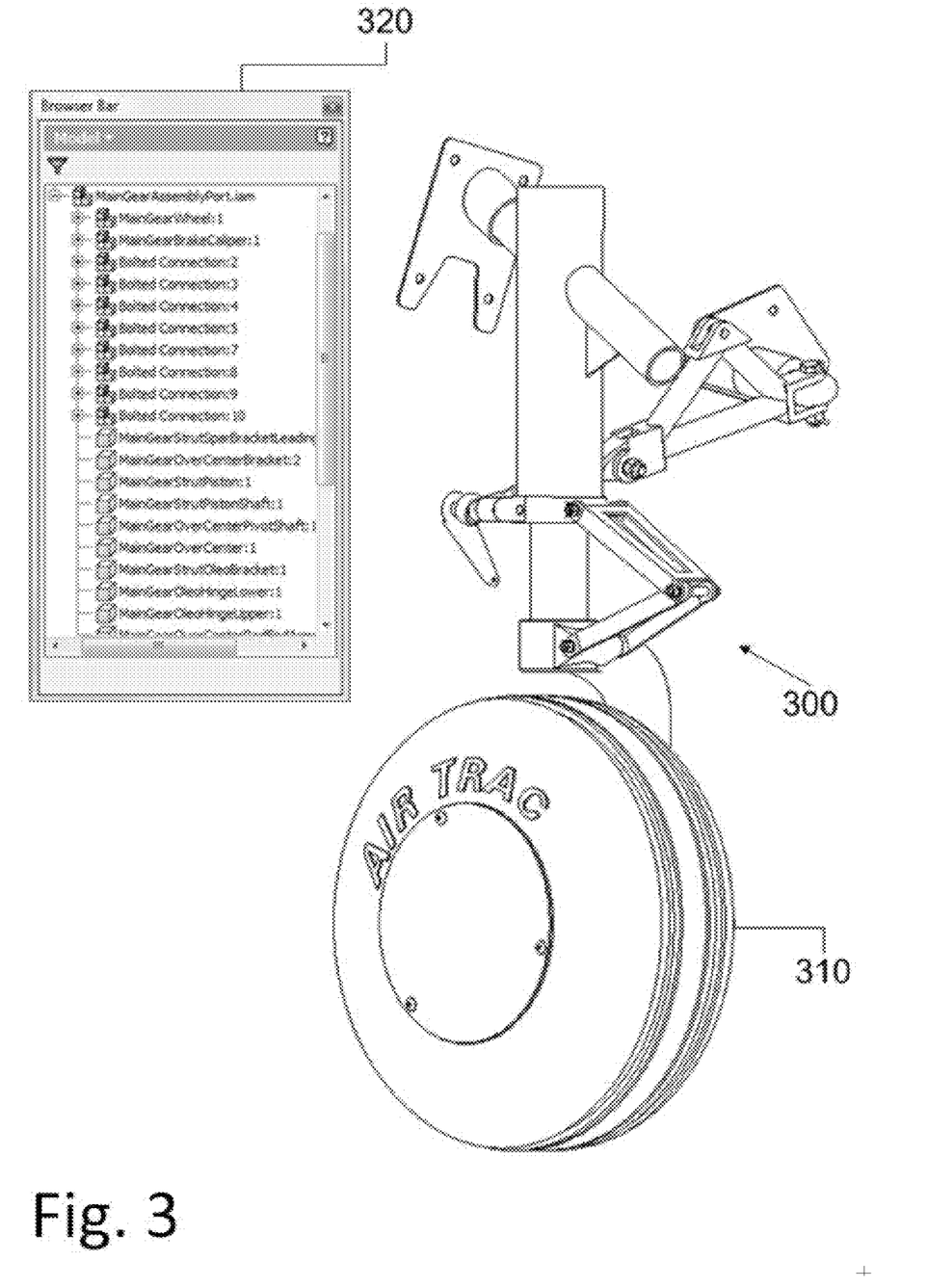
FIG. 3 is a 3D rendering (assembly view) of a landing gear assembly mouse-click menu overlay shown in a system according to the present invention.

In FIG. 3, a 3D model of a landing gear 300 components is shown with an optional drop down menu 320. The user is able to interact with the 3D model using a pointing device 1050, touch sensitive screen 1032, or via a keyboard 1050 or the like. Interaction with the 3D model includes the ability to rotate the 3D model about any axis, decompose or explode the object into subassemblies and/or discrete constituent parts.

FIG. 4 shows the landing gear components of FIG. 3 after the user selected or hovered (with the pointer or cursor of the pointing device) over the wheel assembly 310. FIG. 4 illustrates how selection or hovering over of a part triggers the display of metadata 330 related to the selected part. The metadata 330 typically includes the part name, part number, and cost. However, the metadata may also indicate that the selected part is part of a kit of a subassembly whereas a kit is a collection of related parts which the manufacturer recommends being replaced contemporaneously (along with the selected part). The term kit is distinguished from a subassembly in that a subassembly connotes parts which are assembled or connected whereas a kit is intended to connote that the parts are not assembled.

Figure 6:
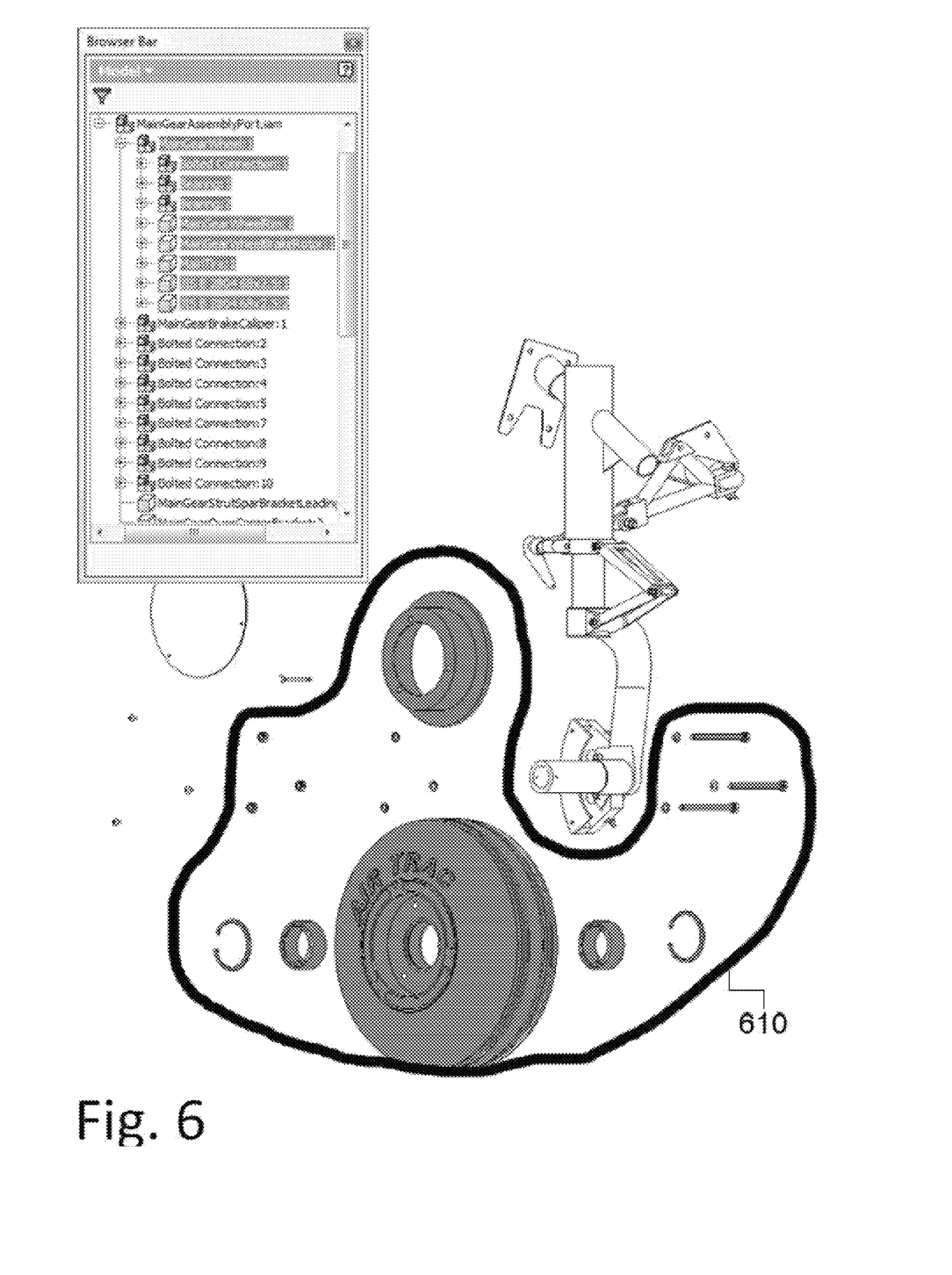
FIG. 6 illustrates the landing gear assembly of FIG. 5 with a bounding line showing the parts sold together as a kit.

Optionally, the system of the present invention may graphically illustrate the relationship of the selected part to the other parts which collectively form the kit or subassembly. For example, the system may draw a border 610 encompassing all of the parts of a kit (FIG. 6), or the system may denote the constituent parts of a given kit or subassembly using color, shading or the like.

Figure 5:
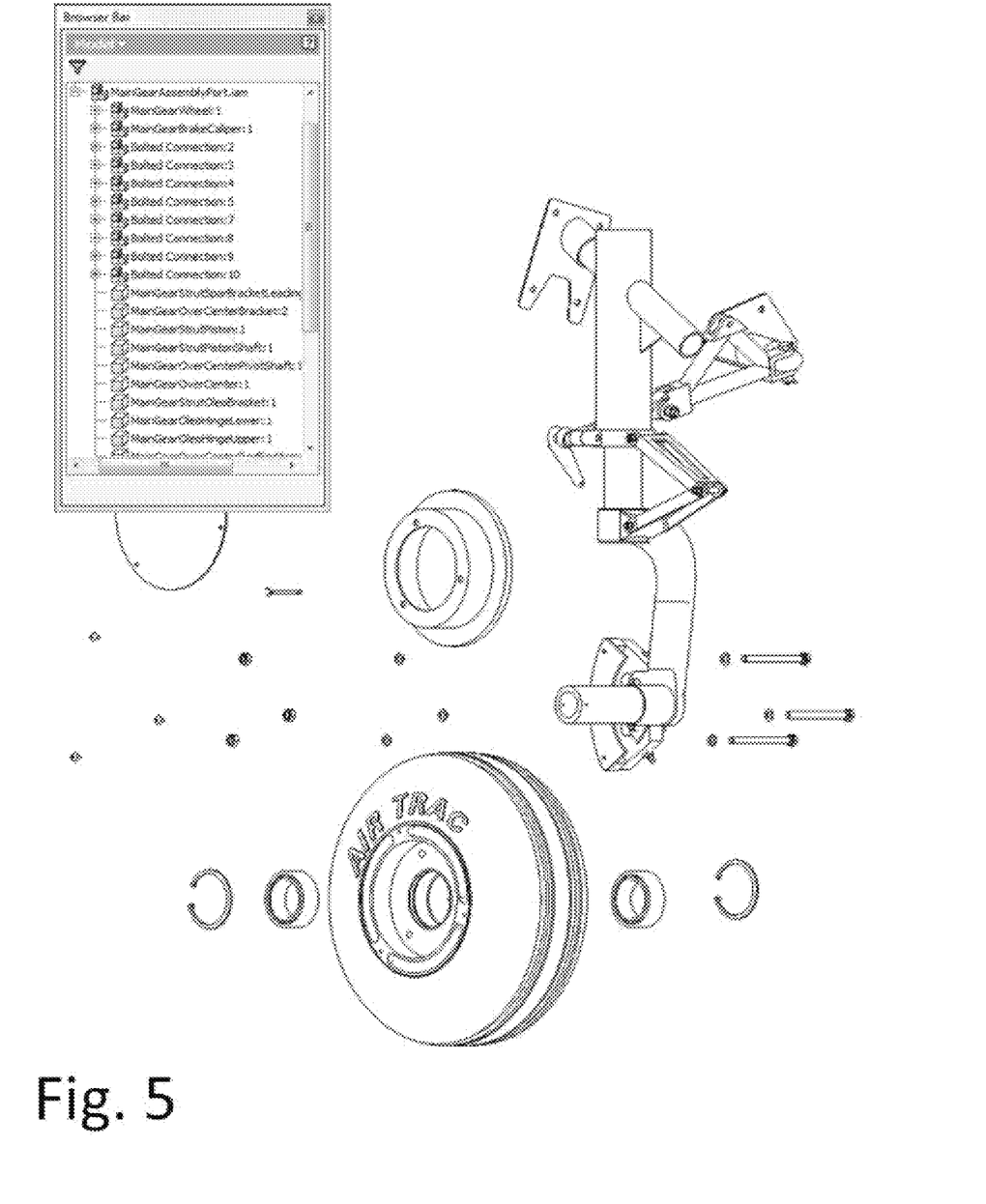
FIG. 5 illustrates the landing gear assembly of FIG. 4 after the wheel assembly was decomposed (exploded) into constituent parts.

FIG. 5 shows an exploded view of the landing gear components of FIG. 4. Metadata associated with the part including the description, price, weight, size, part number, etc, may also transferred to shopping cart, as needed. "3D click-to-buy" system allows for finite decomposition of assembly to individual parts and selection of these parts. 3D click-to-buy includes logic or processes for recommending additional parts required for replacement of the selected part. In addition, the system may also include a list of other items which purchasers of the selected item frequently purchase.

Four dimensional (4D) images represent 3D-images with the addition of time as the 4th dimension can be applied to create animations or sequences of individual frames of 3D data. The process and ability for the "3D-click-to-buy" custom software to pass the required and necessary parametric and/or metadata data from the selected 4D-image actually comprises of an individual frame in the time sequence of 3D-image data and therefore it is possible to execute a "3D-click-to-buy" from within the 4D sequence. This individual frame in the 4D sequence contains all of the 3D information necessary to execute the decomposing of the image and by relation contains all of the parametric and metadata for each component assembly or sub-assembly. At any point the user can select from the images and complete the process of buying the items in whole or in part.

In another embodiment of the invention, the parametric data or metadata necessary for rendering any of the 3D images can be sent over a TV broadcast signal (See, U.S. Pat. No. 7,661,121 which is incorporated herein by reference thereto) similar to that of the Closed Captioning (U.S. Pat. Nos. 7,889,964, 5,327,176 and, 6,215,526 each of which are incorporated herein by reference thereto) with an on-screen display processor. A toggle is provided to either display or not-display the data stream. When the toggle is active the relevant parametric model data is rendered and subsequently displayed to the user. The user is made aware of the data streams, and subsequent models, through a notification (similar to the Closed Captioning overlaid broadcast logo) at the start of the broadcast. Alternatively if the toggle is enabled then any relevant rendered data is presented over the broadcast signal. Users have the option of selecting the rendered data directly from the broadcast signal or are presented with a separate rendered model that has been separated from the broadcast.

Although the foregoing invention has been described in some detail by way of illustration and example, for purposes of clarity of understanding, it will be obvious that various alternatives, modifications and equivalents may be used and the above description should not be taken as limiting in scope of the invention which is defined by the appended claims.

What is claimed is:

1. An apparatus comprising:
   a data storage device operable to:
      provide a plurality of 3D models, at least one of the 3D models for each of a plurality of products, the plurality of 3D models including parametric data and metadata;
      the data storage device operable to receive search criteria of a selected product among the plurality of products;
      the data storage device operable to store the at least one of the 3D models of the plurality of products;
      the data storage device operable to store a list of at least one product that matches the search criteria;
      the data storage device operable to receive a selection of a product from the list of at least one product;
   a video streamer of the 3D model of the selected product from the data storage device;
   the data storage device, having computer executable instructions stored thereon,
   said instructions when executed, performing the steps of:
      displaying the 3D model matching the selection, within the graphical user interface, the 3D model containing image metadata defining an image map, the 3D model in a first format;
      constantly monitoring a cursor position to detect a first interaction with said image map;
      automatically adjusting the 3D model to a second format, by a processor, in response to the first interaction;
      wherein said second format is selected from the group consisting of:
         the 3D model rotated about an axis in relation to an initial position,
         the 3D model enlarged in perspective in relation to an initial perspective;
         the 3D model shrunk in perspective in relation to an initial perspective;
         the 3D model exploded into at least one level of detail to reveal constituent parts;
      constantly monitoring said cursor position to detect a second interaction with said image map;

identifying, via said second interaction, at least one portion of the 3D model, without displaying a reference parts list, to identify a selected product corresponding to said at least one portion; and automatically returning said 3D model, by the processor, to the first format when the first interaction with image map ceases;

the data storage device operable to receive an indication of an interaction with the 3D model by selection of the 3D model, a hovering over the 3D model, or a decomposition the 3D model;

the data storage device operable serve parts, assemblies, or subassemblies of the product in one or more stages of decomposition in reference to the indication;

the data storage device operable to receive a visual identification of the selected product without a reference parts list, table, or any other association list for identification of parts of the selected product;

the data storage device operable to receive a selection of the selected product without any identification data, wherein a selection of a portion of the 3D model references a selected portion of the 3D model;

the data storage device operable to graphically display additional parts to indicate an availability of a kit when a selected item is available as part of a kit including additional parts;

the data storage device operable to transmit a prompt to add the kit to a virtual shopping cart, an electronic parts replenishment system, a 3D printing device, or a 3D fabricating device; and the data storage device operable to-transmit transaction instructions for allowing initiation an ecommerce transaction in reference to the selected product depicted in the 3D model.

2. The apparatus of claim 1, wherein the interaction with the 3D model further comprises rotating the 3D model about an X, Y, and Z coordinate axis.

3. The apparatus of claim 1, wherein the interaction with the 3D model further comprises rotating the 3D model about an axis.

4. The apparatus of claim 1, wherein the indication of the selection or the hovering over a portion of a 3D model with a pointer of a pointing device displays parametric data and metadata associated with the part.

5. The apparatus of claim 4, wherein the metadata includes a part name, part number, price, and availability.

6. The apparatus of claim 1, wherein the selection of the portion of the 3D model also highlights additional parts related to the selected item.

7. The apparatus of claim 6, wherein the additional parts are necessary to the selected product.

8. The apparatus of claim 6, wherein the additional parts are recommended with the selected product.

9. The apparatus of claim 1, wherein a border is drawn around the parts which constitute the kit.

10. The apparatus of claim 1, wherein the ecommerce transaction further comprises adding the selected product to an ecommerce shopping cart, ordering the selected item from an electronic parts replenishment system, or sending parametric data and metadata associated with the part to a 3D printing device or a 3D fabricating device.

11. The apparatus of claim 10, wherein the ecommerce transaction further comprises providing a prompt with an option to purchase at least one part associated with the selected item in a virtual shopping cart.

12. The apparatus of claim 1, wherein the interaction with the 3D model uses one or more of a pointing device, a menu structure, and a touch sensitive display screen.

13. The apparatus of claim 1, wherein streaming the 3D model of the selected product is implemented by software running on a server side workstation.

14. The apparatus of claim 1, wherein the transaction instructions are implemented by software running on a server side workstation.

15. The apparatus of claim 1, wherein the transaction instructions are implemented by software which communicates with at least one of a client side and server side workstations or mobile devices.

16. The apparatus of claim 15, wherein a client side workstation communicates with a server side processor over the internet using a web browser or a mobile application.

17. The apparatus of claim 1, wherein the initiation of the ecommerce transaction further comprises transmitting parametric data and metadata corresponding to the selected item to an ecommerce application, a 3D printing device, or a 3D fabricating device.

* * * * *